(12) United States Patent
Blind et al.

(10) Patent No.: US 8,437,897 B2
(45) Date of Patent: May 7, 2013

(54) METHOD AND DEVICE FOR CONTROLLING AN ELECTRICAL MACHINE OF A HYBRID DRIVE WITH INCREASED AVAILABILITY

(75) Inventors: Stefan Blind, Fellbach (DE); Alexey Yushin, Gerlingen (DE); Holger Niemann, Shanghai (CN); Andreas Heyl, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/736,323

(22) PCT Filed: Feb. 19, 2009

(86) PCT No.: PCT/EP2009/051982
§ 371 (c)(1),
(2), (4) Date: Jan. 10, 2011

(87) PCT Pub. No.: WO2009/121660
PCT Pub. Date: Oct. 8, 2009

(65) Prior Publication Data
US 2011/0264315 A1    Oct. 27, 2011

(30) Foreign Application Priority Data

Apr. 1, 2008 (DE) .......... 10 2008 000 904

(51) Int. Cl.
*B60L 9/00* (2006.01)
(52) U.S. Cl.
USPC .......................................... 701/22
(58) Field of Classification Search ...... 701/22
See application file for complete search history.

(56) References Cited

U.S. PATENT DOCUMENTS

| | | | |
|---|---|---|---|
| 5,697,466 A * | 12/1997 | Moroto et al. | 180/65.25 |
| 7,128,037 B2 * | 10/2006 | Tumback et al. | 123/179.3 |
| 2001/0049571 A1 | 12/2001 | Shimizu et al. | |
| 2002/0019687 A1 * | 2/2002 | Suzuki et al. | 701/22 |
| 2003/0105537 A1 | 6/2003 | Crispin et al. | |
| 2003/0107352 A1 * | 6/2003 | Downer et al. | 322/40 |
| 2004/0044448 A1 * | 3/2004 | Ramaswamy et al. | 701/22 |
| 2004/0216933 A1 * | 11/2004 | Coale | 180/19.1 |
| 2007/0112483 A1 * | 5/2007 | Jeong | 701/22 |
| 2007/0219045 A1 | 9/2007 | Ogata et al. | |
| 2007/0267231 A1 * | 11/2007 | Ogata | 180/65.2 |
| 2007/0276556 A1 * | 11/2007 | Noel et al. | 701/22 |
| 2010/0202089 A1 | 8/2010 | Kuehner et al. | |

FOREIGN PATENT DOCUMENTS

| | | |
|---|---|---|
| CN | 101038031 | 9/2007 |
| DE | 10 2006 003 254 | 7/2007 |
| EP | 1 219 489 | 7/2002 |
| WO | WO 2007/085566 | 8/2007 |

* cited by examiner

*Primary Examiner* — James Trammell
*Assistant Examiner* — Michael D Lang
(74) *Attorney, Agent, or Firm* — Kenyon & Kenyon LLP

(57) ABSTRACT

A method for controlling an electrical machine of a hybrid drive includes: ascertaining at least one operating parameter value of the electrical machine; identifying an error, if the at least one operating parameter value does not correspond to the standard state of an operating parameter; and at least partially restricting the operation of the electrical machine as a propulsion unit if an identified error exists. The electrical machine is operated at least temporarily as a starter when an identified error exists, independently of the operation of the electrical machine as a propulsion unit.

15 Claims, 2 Drawing Sheets

METHOD AND DEVICE FOR CONTROLLING AN ELECTRICAL MACHINE OF A HYBRID DRIVE WITH INCREASED AVAILABILITY

BACKGROUND OF THE INVENTION

1. Field of the Invention

The present invention relates to control mechanisms for operating internal combustion engines and electric motors that are utilized in combination as a hybrid drive.

2. Description of Related Art

The combined use of electrical machines and internal combustion engines in a hybrid drive makes a higher level of efficiency possible when moving vehicles, as well as flexible adaptation of the operating modes of the drive unit to the desired driving mode. In particular, a hybrid drive allows efficient use of the internal combustion engine by storing electrical energy which has been obtained via the electrical machine as a generator, as well as by recovering kinetic energy when decelerating.

On the one hand, in hybrid drives the internal combustion engine is used alongside the electrical machine for propulsion, and on the other hand hybrid drive concepts exist in which the electrical machine is used as the starter for starting the internal combustion engine. In this way, an additional electric starter motor and the associated activating system may be dispensed with.

Compared to typical internal combustion engine drives, a hybrid drive requires a complex control device, since an internal combustion engine must be operated together with an electrical machine in order to provide the propulsion, and with a multi-layered control device for the electrical machine, since the latter is used both as a propulsion element and as a starter.

In known hybrid drives in which the electrical machine is used as the starter for the internal combustion engine, the operation of the electrical machine is monitored, and is limited or turned off when errors are detected, for safety reasons. Control systems are used according to the related art which monitor the activation, the regulation and the sensors of the electrical machine themselves and switch the electrical machine off if necessary. The electrical machine is normally switched off immediately if an error is detected.

In systems of this type, in which an error results in limited operation or in shutting down of the electrical machine, the effects of the responses to a detected error may result in the vehicle no longer being movable. In many cases, in particular if the internal combustion engine is turned off, the result of suppressing or blocking the operation of the electrical machine as a drive unit is therefore that the drive is inoperable, although the turned-off internal combustion engine is available in principle for propulsion. The control of the hybrid drive according to the related art therefore does not provide for any availability of the hybrid engine if only the electrical machine (or its sensors or control device) has an error and it has been detected.

It is therefore an object of the present invention to provide a control method and a control device for a hybrid engine which offers greater availability of the hybrid drive even in the event of an error.

BRIEF SUMMARY OF THE INVENTION

The present invention makes it possible to operate the hybrid drive even with an electrical machine that is no longer suitable as a drive unit for driving operation, for example due to errors in the control device, in the sensor system or in the electrical machine itself. Using the device and the method of the present invention, it is possible to activate disabled vehicles having a hybrid drive, whose electrical machines may not be usable as a drive unit, but whose internal combustion engines are operable in principle. The shut-down of the entire hybrid drive in the event of errors in the electric drive, i.e., in the electrical machine, is surmounted by the device and the method according to the present invention. According to the present invention, the electrical machine, which is no longer suitable as a drive component due to the error, may nevertheless be operated in a different function, i.e., as the starter for the internal combustion engine. As a result, the hybrid drive may be activated even when the electric drive component is lacking, by starting the internal combustion engine using the defective, i.e., no longer drive-capable, electrical machine.

The concept of the present invention lies in not activating the operation of the electrical machine using a single control component, but separating the two functions of the electrical machine, i.e., drive and starter, with regard to controlling or error monitoring. In particular, the concept according to the present invention lies in separating the control and monitoring for the different individual functions, i.e., starter function and drive function, at least some of the time. According to the present invention, error response or error assessment is therefore provided on a function-specific basis, at least some of the time, in order to activate the electrical machine as a drive independently of the electrical machine as a starter.

The present invention therefore provides on the one hand for blocking the electrical machine as a drive, at least partially or completely, so as to take account of error messages and thus to put a stop to dangerous situations and prevent damage to the electrical machine. Since the operation of the electrical machine as a starter must satisfy other requirements than those that apply to the electrical machine as a drive, on the other hand according to the present invention the electrical machine is enabled at least briefly, despite any error message, in order to carry out its function as starter. Whereas high mechanical power over long time intervals is required for an electrical machine as a drive, operation of the electric motor as the starter of the internal combustion engine of the common hybrid drive requires only a short time period, for example a few seconds. It is apparent that numerous types of errors must result in shutting down the electrical machine as a drive, so as not to impair the driving behavior and to prevent damage to the electrical machine or to the vehicle, while the same types of errors would allow the electrical machine to function as a starter without the driving behavior being impaired or damage being expected. Furthermore, it may be significantly easier to provide for activation of the electrical machine as a starter, for example through preset parameters, whereas operation of the electrical machine as a drive is significantly more complex, for example in order to satisfy the driver's wish or to provide for a balanced torque control. It is therefore possible that even errors in the control device that do not allow operation of the electrical machine as a drive may not impair the operation of the electrical machine as a starter, it being possible preferably for the starting sequence to be provided by a simple, preset sequence of operating parameters. The same applies to sensor errors, which do not allow prolonged and power-intensive operation of the electrical machine as a drive, but at the same time allow short-term operation of the electrical machine as a starter at lower power without further adverse effects.

Therefore a method according to the present invention for controlling an electrical machine of a hybrid drive is provided, where the electrical machine is operated both as a starter and as a propulsion unit of the hybrid drive, although not simultaneously, operating parameters being ascertained, on the basis of which errors may be identified. Errors are identified when an operating parameter does not correspond to a standard state of the operating parameter.

In reference to an electrical machine, variables that may be regarded as operating parameters are thus the rotational speed, the torque generated or absorbed, a winding voltage, a winding current, a phase shift between winding voltage and winding current, an excitation current, a temperature, an internal winding resistance, magnetic field strengths, or other variables that are relevant for the operation of an electrical machine.

Operating parameters or operating parameter values also count as states of a control device that activates or regulates the electrical machine, where operating parameters that relate to the control device, for example a control device output signal value that determines the rotational speed or the drive power of the electrical machine, a control device input signal value that corresponds to a target setting, an intermediate result that occurs during computations of the control device, a duty factor of a current using which the electrical machine is activated, a torque error, i.e., a difference between setpoint and actual torque, a setpoint torque or an actual torque, are checked by comparing particular values to a standard value range, or by recalculating values using another control component and comparing them to the value in question. Operating parameters that are checked for errors also count as values that refer only to the control device itself, for example a result of a control device self-test, a power supply voltage value of the control device, or a control device temperature.

Finally, operating parameters of a sensor should count as operating parameter values to be checked which monitor the operation of the electrical machine and which deliver input signals to the control device. Such operating parameters that relate to a sensor are an output signal of the sensor, where the output signal may be checked for plausibility with the aid of a standard interval, or may be compared with the aid of some other sensor signal and/or checked for plausibility, as well as other operating parameters that permit conclusions about the correct functioning of the sensor to be drawn. In general, the values may also be combined, for example using a weighted sum, so that deviations from the standard value are totaled and evaluated as a sum, for example compared to a standard value or a standard interval.

In particular, the control device may be provided at three levels, where the first level monitors a correlation of torques, the calculation of the target and actual torque, and various sensor data, and issues an error message if appropriate. At the second level the functioning of the first level is monitored, so that the operating parameters being assessed include values of the first level, for example calculated values or intermediate values. The second level preferably includes a comparison of torques whereby miscalculations of the first level may be identified, but where sensor errors may also be identified, preferably by considering multiple sensor data and/or multiple calculated data in combination or individually, for example for comparison with corresponding standard ranges.

At a third level, calculation components of the control device are monitored, for example by checking calculations of levels 1 and 2 or through independent function tests of the control device.

The operating parameters which are checked in general according to the present invention regarding an error must therefore be formulated broadly, and include not only individual operating data of the electrical machine that relate to particular physical values, but also states and signals that come from one or more sensors which monitor the operation of the electrical machine, as well as states and values that are input into a control device or regulator of the electrical machine, are calculated in it or are output by it. Thus it is possible to identify errors not only in the machine itself, but also in other components that are necessary for the operation of the electrical machine.

When an error is detected, the operation of the electrical machine in its function as a propulsion unit is at least partially limited, for example by switching the system off irreversibly, it being possible for the system to be re-initialized by an automotive workshop, or by switching off the vehicle or the hybrid drive, or by a new start signal to start operation of the hybrid drive. For example, in the case of a permanent error, i.e., in the case of a recurring error or an error that persists beyond a certain time period, the drive system is deactivated even after a start signal.

Furthermore, as a result of the error being detected, the power output or the running period of the electrical machine may be limited, for example in that a final stage that activates the electric motor operates with limited currents for a limited operating interval. Such a response is provided for example for errors which make limited operation of the electrical machine still possible, but where the restrictions, for example in terms of power output, may result in the electrical machine not being usable as a starter because of severely reduced power output.

As a further response to detected errors, the control device may be reset, for example by switching off the end stage and initializing the control device; some errors also provide for debouncing the error, i.e., correcting the corresponding operating parameter. Consequences of this type of the detection of errors may also result in the electrical machine being unable to assume the function of a starter, although operation of the electrical machine as a starter (i.e., briefly at low power) would not result in damage or dangerous situations.

Therefore, according to the present invention, when an error is detected and the operation of the electrical machine is limited accordingly at least briefly in its function as a starter, it is activated independently and in a different manner than when the electrical machine is operated as a propulsion unit. In order to provide the control devices separately from each other, at least briefly, so as to provide different and independent error consequences for the two different functions of the electrical machine (starter/propulsion unit), the electrical machine as a starter is therefore operated (monitored) by the method and the control device according to the present invention in a different manner, i.e., with less restrictions, than the electrical machine in its function as a propulsion unit. For safety reasons, preferably such a separation is provided only for an initial time frame, i.e., for a time period that is suitable for starting the internal combustion engine using the electrical machine. This time period may begin at the appearance of a starter start signal, the starter start signal being generated for example by the driver operating a start button. The time period preferably ends after it has been determined that the internal combustion engine is running or has reached a stable state, while the end of the time period may be recognized by corresponding operating parameters of the internal combustion engine that exceed certain thresholds, for example upon reaching a certain internal combustion engine speed, or a certain length of time being specified in which the electrical machine as starter transfers mechanical power to the internal combustion engine in order to start it, the specified length of time corresponding to a measured or empirical value at which it may be assumed that the internal combustion engine has reached a stable operating state after that time.

Normally a higher-level driving control device controls the operation of the internal combustion engine and the electrical machine, in order to shut down the internal combustion engine if appropriate, for example if a certain battery charge level has been reached. In that case, the driving control of the vehicle relies on the electrical machine as the only propulsion unit. To prevent a chosen or activated driving mode, i.e., driving only with the internal combustion engine, only with the electrical machine or with a combination of both drive elements, from resulting in the driving mode control device shutting down the internal combustion engine, even though the electrical machine cannot be operated as a drive due to an error, the higher-level driving mode control device is preferably also operated in such a way that when an error is detected a driving mode is not chosen in which the electrical machine is operated as the only propulsion unit. This may be provided through appropriate coupling between the control device of the electrical machine and the driving mode control device, or by a driving control device that receives an error signal, or commands which correspond to the consequences of discovered errors in the electrical machine, so as to limit the available driving modes to executable driving modes, i.e., to driving modes in which the electrical machine is not operated as the only propulsion unit.

The mechanisms described above, which are used to separate the two functions of the electrical machine according to the present invention, at least briefly, may be provided for example by a dual-function unit, the dual-function unit being connected to and activating the electrical machine in such a way that when a start wish is present while an error of the electrical machine has been detected, the electrical machine is operated as the starter. The operation as a starter may be provided by operating values previously stored in a memory which provide a typical starting sequence, for example using constant operating parameters. But to prevent the electrical machine from being used additionally as a drive, in spite of errors, the dual-function control unit preferably provides that the consequences of the detected error have an effect on the operation of the electrical machine as a propulsion, where the electrical machine may be shut down, for example, as described above, or may be limited in its operating parameters.

The electrical machine as a starter only has to supply the internal combustion engine with mechanical power for a short time, for example less than 10 seconds, less than 5 seconds, less than 3 seconds or less than 2 seconds, so that it is sufficient to separate the control device of the electrical machine for its two functions only briefly, for example for the duration of a starting sequence or for a time period shorter than 30 seconds, shorter than 10 seconds, shorter than 5 seconds, shorter than 3 seconds or shorter than 2 seconds. Since the detected error is thus ignored only briefly, the potential for endangering the defective machine is small, and the occurrence of damage to the electrical machine from prolonged operation despite the error is prevented.

Another way to describe the concept according to the present invention is that an ascertained error in the electrical machine is given full consideration for operation as a propulsion unit, whereas for the function of the electrical machine as a starter a detected error is ignored, at least briefly, if the start of the internal combustion engine is desired. The errors are thus suppressed or ignored, as long as they relate to operation of the electrical machine as a starter. This may be implemented by having a control device include a logic circuit which on the one hand receives an error signal via an error signal input, and which is able to receive a start signal via a start signal input. In this case, the logic circuit links the signal pattern or the level of the start signal to the signal pattern or the level of the error input, in order to suppress the error signal at least briefly when a start wish is present (which is expressed by a corresponding start signal). In the same way, a logic circuit may also be provided which links the start signal to a signal which suppresses, at least briefly, a response of the control device to a detected error, i.e., a control signal that corresponds for example to the blocking of the electrical machine. Thus typical error signals may be provided which, however, according to the present invention are suppressed if necessary by a present start signal, at least briefly, in order to be able to use the electrical machine at least briefly as the starter of the internal combustion engine, despite errors.

The suppression of the error signal, or of a control signal which is produced as a consequence of the error signal, may be implemented by a "deactivation" bit which is received by a higher-level vehicle control device, which thereupon briefly deactivates the monitoring of the electrical machine so as to suspend, at least briefly, the limitations that result from the error. Such a higher-level vehicle control device may also provide appropriate operating parameters for the electrical machine such as are suitable for a starting sequence, when a start signal is present. For example, the higher-level vehicle control device may supply a suitable torque and a suitable rotational speed as set targets to the control device of the electrical machine, which thereupon implements the set targets. If a successful start of the internal combustion engine is then detected, or if a time period has elapsed after which a successful start of the internal combustion engine may be assumed, the higher-level vehicle control device may restore the electrical machine and the control device of the electrical machine back to a state in which the operation is restricted or prevented in accordance with the error. For example, after a successful start the higher-level vehicle control device may withdraw the deactivation bit again, so as to again suspend the suppression of the error response by the control device of the electrical machine. By suspending the suppression of a normal response to errors, the electrical machine is preferably brought to a safe state which corresponds to limited operation of the electrical machine or switching off of the electrical machine. This guarantees that the electrical machine cannot be restarted, in order to prevent damage to the electrical machine. Preferably the error signal, or a response thereto, is not suppressed if the internal combustion engine is running, so that the internal combustion engine does not need to be started. After the time period has elapsed in which the electrical machine is operated as a starter, the separation of the functions of the electrical machine described above is therefore preferably suspended again, and the operating state that is usually set when an error occurs is established. To signal to the driver that the electrical machine has an error despite the successful start, a display element may be activated, for example an LED or a corresponding depiction in a display, which advises the driver that the electrical machine has an error and that the vehicle should be taken to a shop. Instead of or in combination with the display element, other signals could also be generated for the driver, for example acoustic signals.

As described earlier, the driving mode control device is preferably limited in such a way that no driving mode is permitted in which the electrical machine is used as the only drive, such a restriction being provided in particular during operation of the internal combustion engine as a propulsion unit. In other words, switching of the hybrid drive to only electric drive is preferably blocked if the electrical machine has an error and the internal combustion engine has been started successfully.

So as not to unnecessarily place undue demand on the electrical machine which has an error, in its function as starter, at the same time clutches are preferably disengaged which connect the electrical machine to additional loads, for example an alternator, an output train, compressors, or elements of an air conditioning system which represent a mechanical load. In the same way, the internal combustion engine is preferably separated from other loads during the starting sequence, so that essentially at least most of the torque produced by the electrical machine, i.e., more than 50 percent, more than 80 percent, or more than 90 percent, is transmitted to the internal combustion engine and does not go to other loads. For example, a converter clutch ahead of the transmission may be disengaged before the beginning of the starting sequence, i.e., the starting of the internal combustion engine. In the same way, the internal combustion engine is preferably operated before the starting phase in such a way that it receives a substantial part of the torque supplied by the electrical machine and uses it for the starting sequence. Converter clutches that receive the torque supplied by the electrical machine are therefore preferably mostly disengaged, so that they receive and pass along only a small share of the total torque produced. Instead of predefined operating parameters during the starting phase, the control device may also provide a regulating system that is suitable for starting the internal combustion engine, in order, for example, to regulate the transfer of torque appropriately. Furthermore, the setting of a manual transmission is preferably checked, so that a starting sequence is only possible when the manual transmission is disengaged. This means that the corresponding clutch is disengaged, in order to prevent a large part of the torque which is produced during the starting sequence by the electrical machine from being transmitted to the wheels of the vehicle in which the hybrid drive is provided. Such a check of the setting of the manual transmission is preferably provided in general for all hybrid drives whose electrical machine works both as a drive and as a starter.

According to an example embodiment of the present invention, the control device of the electrical machine is connected through a connection, for example by cable, to a hybrid control device that controls and monitors the operation of the entire hybrid drive as a higher-level control component. Through such a connection, the hybrid control device may, for example, transmit a signal to the control device of the electrical machine which causes the control device to operate the electrical machine according to the present invention at least temporarily as a starter, although the electrical machine is shut down or operating limitedly in its function as a drive due to an error. Furthermore, the control device of the electrical machine may notify the connected hybrid control device via this connection or via some other connection when a starting sequence has been completed successfully, or when the corresponding time interval has run out, enabling the hybrid control device to end the suppression of the normal error response of the control device again. Normal error response refers here to the partial or complete restriction of operation of the electrical machine as a propulsion unit, which represents the response to a detected error.

DETAILED DESCRIPTION OF THE INVENTION

Figure 1:
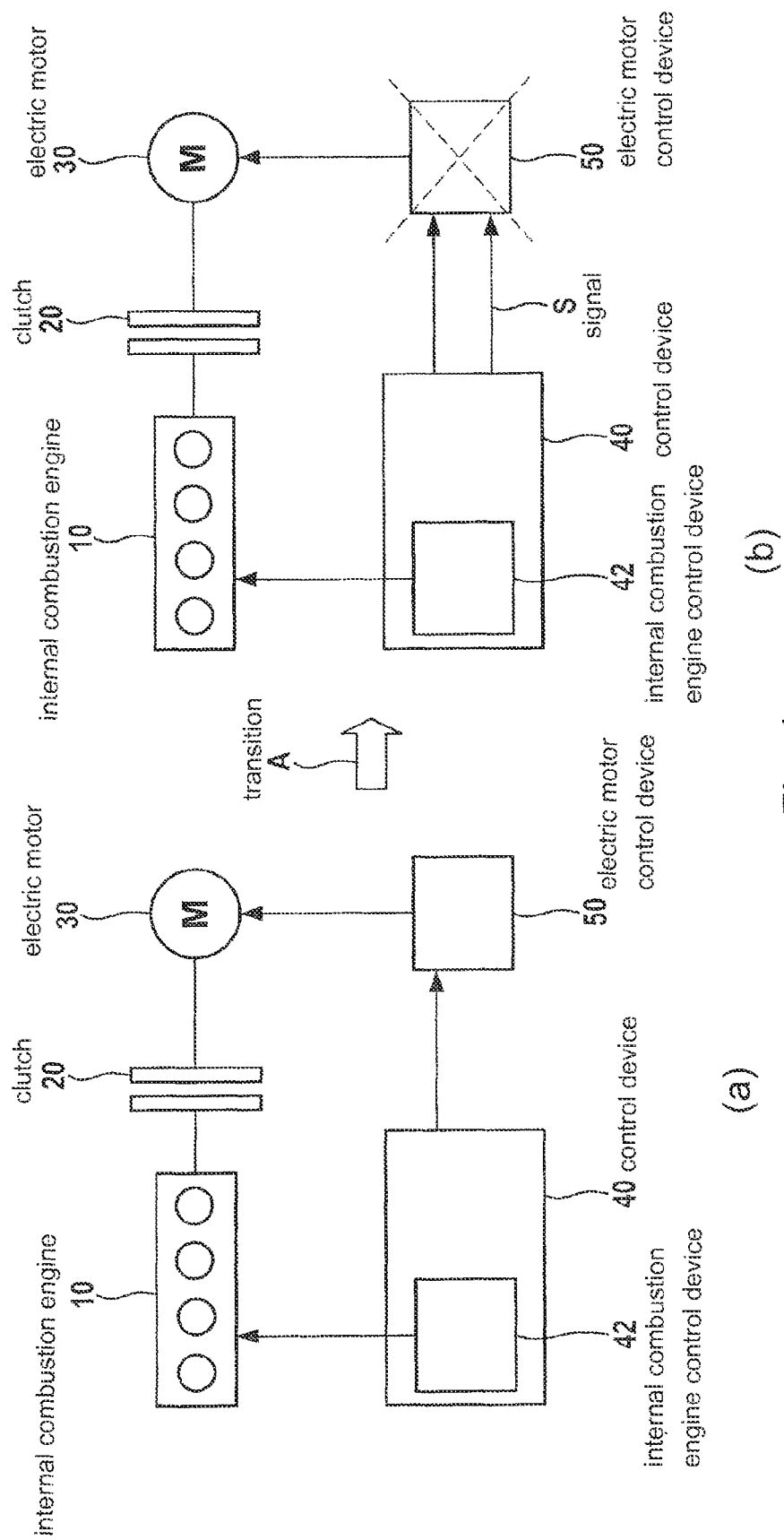
FIG. 1 shows a diagram of the control device according to the present invention (a) in normal operation and (b) in a state that exists when an error has been detected.

FIG. 1 depicts a schematic diagram of a control device of a parallel hybrid engine in two states, (a) and (b). The diagrams of the figure show an internal combustion engine 10 which is connected to an electric motor 30 through a clutch 20. Depending on the activation and clutch state of clutch 20, internal combustion engine 10 and/or electric motor 30 transmit(s) mechanical rotational energy to the drive (not shown), or internal combustion engine 10 transmits rotational energy to motor 30 to gain electrical energy (preferably with the drive disconnected), or electric motor 30 transmits mechanical energy in the opposite direction through clutch 20 to internal combustion engine 10 in order to start the latter. As explained earlier, the parallel hybrid drive also provides for transmitting mechanical energy (i.e., kinetic rotational energy) from electric motor 30 to internal combustion engine 10 to support the drive.

A control device 40 is connected to internal combustion engine 10, and through an electric motor control device 50 to electric motor 30. Both connections serve to transmit a torque request (for example in the form of a signal) to internal combustion engine 10 and to electric motor 30 (preferably via a corresponding control circuit). Control device 40 is provided to control the (entire) hybrid drive, and includes an internal combustion engine control device 42. To control the electric motor, an electric motor control device 50 is provided, which is external to the hybrid control device. In alternative specific embodiments, not shown, the control components that are assigned to the individual motors (internal combustion engine control device 42 and electric motor control device 50) may both be provided within overall control device 40, may both be provided outside of control device 40, or only one of them may be provided in overall control device 40, as depicted in FIG. 1. Overall, control device 40 may be perceived as a dual-function control unit of the control device according to the present invention. In FIG. 1(a) the arrows represent the direction of transmission of the torque request. Likewise, the corresponding arrows in FIG. 1(b) represent the corresponding transmission; however, the lower arrow between control device 40 and electric motor control device 50 transmits a signal according to the present invention to monitor deactivation. The transmission direction corresponds in general to the direction of the arrows.

During normal operation, as depicted in FIG. 1(a), control device 40 transmits the torque request to the electric motor via electric motor control device 50. But if an error occurs in electric motor 30, this is detected by electric motor control device 50, whereby the electric motor would be completely shut off according to the related art. However, the method and the control device according to the present invention make it possible to temporarily suspend the blocking of electric motor 30 which results from the error, at least briefly, in order to activate the latter as a starter. To this end, in the circuit of FIG. 1 an additional deactivation monitoring signal S is transmitted from control device 40 to electric motor control device 50, in order to suspend the blockage provided by electric motor control device 50 for the starter sequence. The blockage provided by electric motor control device 50 is thus suspended, as depicted by the dashed crossed lines on electric motor control device 50 in FIG. 1(b). The suspension of the control of the electric motor is only temporary, however, so that the dashed crossed lines do not apply to the (entire) drive mode of the electric motor. Preferably, during the suspension of the blockage that is provided by electric motor control device 50, the torque request signal issued by control device 40 is forwarded directly to motor 30, although according to the related art the electric motor control device would completely prevent this in the event of an error.

Signal S is thus an override signal, which, however, disables electric motor control device 50 only briefly, in order to enable at least a brief starter phase of electric motor 30. Signal S may be transmitted via a control line of its own, or it may claim a logical channel of its own which connects control device 40 to electric motor control device 50.

Furthermore, control device 40, electric motor control device 50 or both may have an output unit (control device 40) or an input unit and output unit (electric motor control device 50) that prevents a permanent active state of suspension signal S (the override signal), for example an RC element, a monostable flip-flop or a corresponding software segment which runs in control device 40 or in electric motor control device 50. Furthermore, signal S may be a deactivation monitoring signal, for example a deactivation bit, that monitors the supervision of control device 40 over the suspension of the blocking of electric motor control device 50, to which end a starter signal must be transmitted from electric motor control device 50 to control device 40 (the corresponding arrow direction is not shown). That makes it possible for the control device itself not only to control but also to monitor the blocking of the error response of electric motor control device 50. Monitoring of this sort allows detection of the level of error (no operation possible/limited operation as starter possible), as well as distinguishing errors of the electric motor that allow a starting sequence, from errors that completely prevent operation of the electric motor.

Furthermore, control device 40 may be connected to clutch 20 and other clutches, in order to activate the latter and/or query them about their clutch state. The querying of the clutch state may be necessary if a starting sequence with a mechanically coupled drive is to be detected and prevented. Such connections between the control device and the clutch are not depicted in FIG. 1 for reasons of clarity.

The transition from the state depicted in FIG. 1(*a*) to the state that is depicted in FIG. 1(*b*) is brought about by an error signal, for example due to an error in the electric motor control device. Since control signal S according to the present invention suspends the function (and thus in the case of the named example also the malfunction) of electric motor control device 50 for the starting sequence, a starting sequence is possible even if the electric motor control device is defective. Arrow A designates such a transition which is caused by an error in the electric motor control device. Furthermore, arrow A may be a detected error in electric motor 30, which prevents the functioning as a drive but permits the functioning of the electric motor as a starter. Furthermore, transition A may be caused by the types of errors listed above (for example, sensor errors or assessment errors or sensor signal transmission errors). Preferably, the errors that trigger transition A are detected by control device 40 or by a higher-level control device, where the component which detects the error preferably also controls or triggers the brief prevention of the error response, preferably by emitting a signal S or similar commands.

Figure 2:
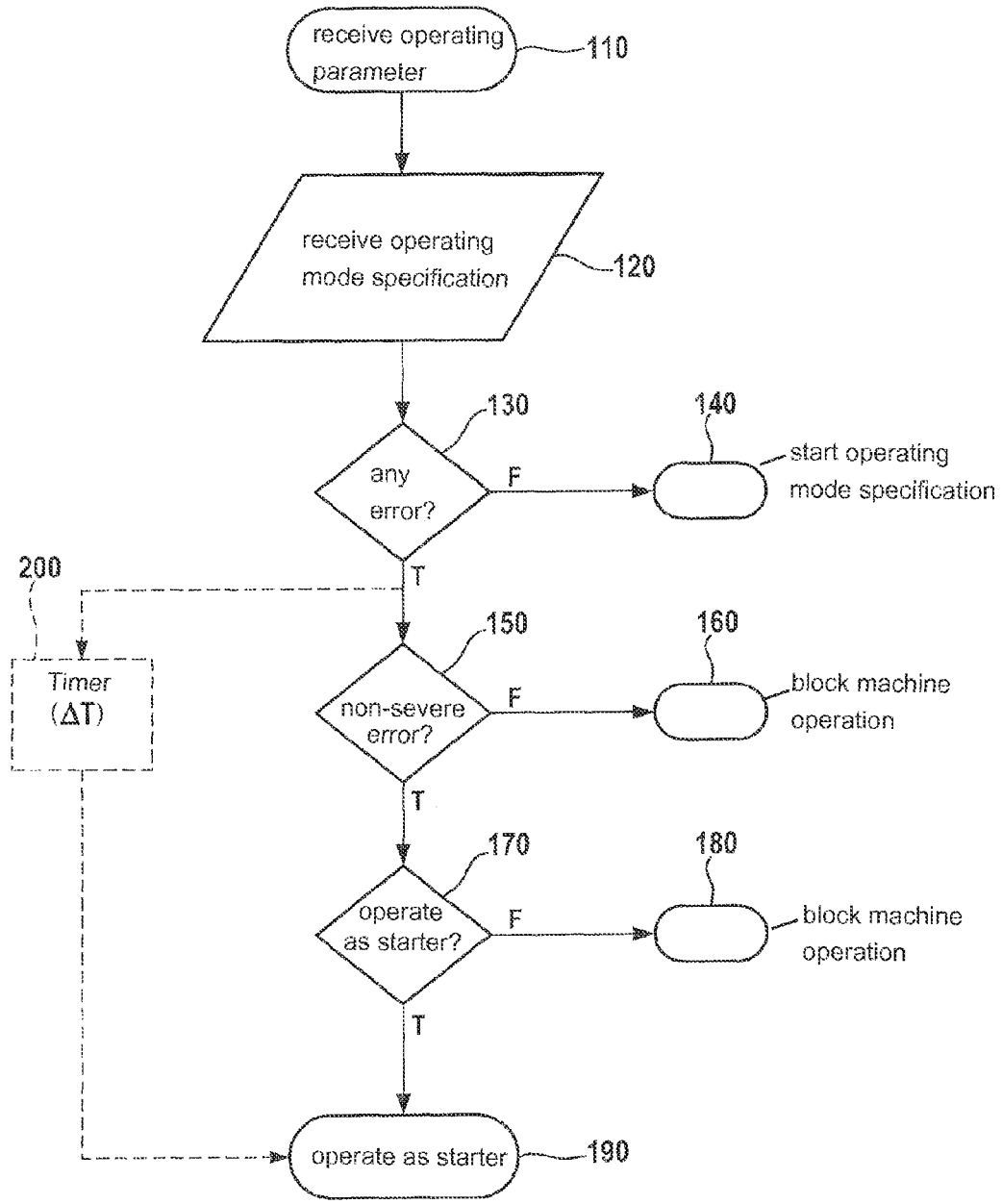
FIG. 2 shows a flow chart of one embodiment of the method according to the present invention.

FIG. 2 shows a sequence chart of an embodiment of the method according to the present invention in the form of a flow chart according to DIN 66001 or ISO 5807. The method starts with step 110, whereupon at least one operating parameter value, for example a temperature, is received in step 120, for example by a sensor. In step 120 an operating mode specification that pertains to the electrical machine is also received. The operating mode specification may come from a control device and/or from an operator, and indicates whether the electrical machine is to be used as a starter for the internal combustion engine or as a propulsion unit, i.e., for traction. Before the operating mode specification is implemented, according to the present invention an error query is performed in order to determine whether the operating mode to be set is permissible. In the subsequent step 130 the operating parameter is compared to a permissible setting range to determine an error. Instead of comparison 130 and input 120, an error entry may also be made (not illustrated), which reproduces an error that was found in the electrical machine or in an associated motor control device (for example, by monitoring devices). If no error is discovered in step 130 (F, false), the electrical machine is operated in step 140 according to the operating mode specification. Up to this step, the method according to the present invention is similar to known methods for monitored control of electrical machines.

The differentiation according to the present invention based on the severity of a detected error, as well as the resulting operating steps, will now be described on the basis of the flow chart of FIG. 2. Thus if the method or the control device according to the present invention detects an error in step 130 (T, true), the electrical machine is not completely blocked, as is the case in methods according to the related art, but rather additional differentiations are made, as described below. Following an entered error or an error detected by comparison (branch 130, T), in step 150 a check is performed to determine whether the error is severe and the electrical machine should be completely blocked for safety reasons, or whether only the operation of the electrical machine as a propulsion unit should be blocked. If it is determined in step 150 that the operation as a starter should also be blocked due to the severity of the error (F, false, error does not permit operation as starter), then in step 160 the operation of the electrical machine is completely blocked. If it is determined on the other hand in step 150 that the error permits operation as a starter (T, true, error permits operation as starter), then step 170 queries whether the operating mode to be set corresponds to operation as a starter. If this is not the case (F, false, operating mode=operation as propulsion unit, i.e., operating mode is not starter operating mode), then the electrical machine is blocked in step 180. A blockage that may have been initiated in step 160 is thus upheld. Step 160 is thus equivalent to step 180. If it is determined on the other hand in step 170 that the operating mode to be set corresponds to operation as a starter (T, true), the electrical machine is operated as the starter in step 190. Preferably, in step 190 the operation of the electrical machine as a propulsion unit is also blocked. Such a blockage may also be provided in step 160. In that case the blockage is upheld in step 190.

In an example embodiment of the present invention, limited-time operation as a starter is permitted despite detection of an error, if the type of error permits this (i.e., low severity of the detected error). The implementation of the limited-time operation is depicted in FIG. 2 with a dashed line. If it is detected therefore in step 130 that an error is present, a predetermined time period $\Delta T$ is provided from the moment the error is detected, see step 200, preferably by means of a timer. If it is then determined in step 170 that the operation of the electrical machine as a starter should be carried out, a query is performed before the initiation of step 190 (operation as starter) as to whether the predetermined time period is still running. The query is not depicted in FIG. 2 for reasons of clarity. If step 170 results in T (true) and time period $\Delta T$ has not yet run out, then step 190 is executed. If time period $\Delta T$ has run out, then the electrical machine is also blocked for starter mode (not shown), even if step 170 yields "true." Step 200 thus represents an additional precondition for step 190.

For reasons of clarity, FIG. 2 thus differs from the depiction of the norm to the extent that the branching is not shown which is provided by the precondition of step 200. The query or branching that results from the predetermined time period ΔT or from step 200, as well as the resultant blocking, is not depicted in FIG. 2. Also not shown is a loopback according to the present invention from blockages 160, 180 or from step 190 to start 110, to step 120 or to queries 130, 150 or 170 which would result in an automatic suspension of the blockage if some other error state results (no error/error of low severity that permits operation as starter). In principle, the query steps in FIG. 2 may also be combined and/or interchanged, as long as it is true that the same logical links result as are defined by the queries.

What is claimed is:

1. A method for controlling an electrical machine of a hybrid drive, the electrical machine being configured to be selectively operated both as a starter of an internal combustion engine of the hybrid drive and as a propulsion unit of the hybrid drive, the method comprising:
   ascertaining at least one operating parameter value of the electrical machine;
   detecting at least one of a control device malfunction error in the hybrid drive, a hybrid drive sensor malfunction error, and a malfunction error in the electrical machine if the at least one operating parameter value does not correspond to a reference standard state of the operating parameter; and
   upon detecting of an error, (i) at least partially limiting the operation of the electrical machine as the propulsion unit, and (ii) independently of the operation of the electrical machine as a propulsion unit, at least temporarily operating the electrical machine as the starter,
   wherein the ascertained at least one operating parameter value is at least one of: a rotational speed, a torque generated or absorbed, a winding voltage, a winding current, a phase shift between winding voltage and winding current, an excitation current, a temperature, an internal winding resistance, and a magnetic field strength, and wherein the malfunction error in the electrical machine is detected if the at least one operating parameter value does not correspond to the reference standard state of the operating parameter.

2. The method as recited in claim 1, wherein the at least temporary operation of the electrical machine as a starter includes at least one of:
   operating the electrical machine according to one of predefined starter operating parameters or a predefined starter operating sequence specification one of: (i) during a predetermined time period beginning with the presence of a starter start signal; or (ii) at the end of a starting phase of the internal combustion engine;
   temporarily enabling a start signal input;
   temporarily suspending a blockage of the electrical machine; and
   temporarily deactivating one of a monitoring function or a control function of the electrical machine one of (a) after the detection of the error for a predetermined time period or (b) until the starting phase of the internal combustion engine has ended.

3. The method as recited in claim 1, wherein the error corresponds to one of a malfunction of a sensor of the electrical machine, a malfunction of a control device of the electrical machine, or a malfunction of the electrical machine.

4. The method as recited in claim 1, wherein the at least one operating parameter value includes at least one of the following variables:
   a sensor output signal value provided by a sensor of the electrical machine; a control output signal value; a control input signal value; a control intermediate result; a control self-test result; a duty factor of a phase winding current; an error torque provided as the difference between a setpoint torque and an actual torque; a setpoint torque provided by a control device of the electrical machine; an actual torque provided by a control device of the electrical machine; a temperature, a torque, a rotational speed, an excitation current, a phase winding voltage, a phase winding current, a phase angle of a winding current and an internal winding resistance of the electrical machine.

5. The method as recited in claim 1, further comprising:
   monitoring the electrical machine, wherein the monitoring includes the detection of an error, the monitoring including at least one of the following operation levels (a) to (c):
   (a) monitoring and coordinating torques of the electrical machine and torques of a vehicle drive connected to the electrical machine; calculating setpoint torque and actual torque of the electrical machine; and verifying the plausibility of sensor signals of a sensor of the electrical machine;
   (b) monitoring at least one of the functions of operation level (a); monitoring the calculations of operation level (a); monitoring the sensor signals verified in operation level (a) and detecting sensor errors; and
   (c) monitoring the functionality of devices providing the functions, calculations, monitoring, detections, and verifications of operation levels (a) and (b).

6. The method as recited in claim 1, wherein the at least partial limitation of the operation of the electrical machine includes one of:
   resetting a control device controlling the operation of the electrical machine, wherein the resetting includes: setting at least some state parameters of the control device to an initial value; switching off an end stage which activates the electrical machine; or limiting the maximum power of the end stage to a reference basic operation power value by limiting a control signal of the end stage;
   introducing a limitation of the operation of the end stage with regard to: a duration of activation, an average output power, or a peak output power of the end stage, by shifting the electrical machine to a substitute operating state; or
   switching off and blocking the electrical machine, a control element of the electrical machine, the end stage of the electrical machine, or a drive system that includes the electrical machine, wherein the blocking is selectively suspended by the starter start signal or by being manually reset.

7. The method as recited in claim 1, wherein, when a detected error is present, a driving mode control device of the hybrid drive is limited to operating modes in which the electrical machine is not operated as the sole propulsion unit.

8. The method as recited in claim 1, further comprising:
   identifying whether the detected error is severe; and
   when the detected error is severe, overriding the temporary operation of the electrical machine as the starter and completely blocking operation of the electrical machine.

9. The method of claim 1, wherein the ascertained at least one operating parameter value is selected from the group consisting of: the rotational speed, the torque generated or absorbed, the temperature, the internal winding resistance.

10. A control device for a hybrid drive, comprising:
a dual-function control unit connected to an electrical machine of the hybrid drive and configured to control the electrical machine of the hybrid drive to selectively operate as both a starter of an internal combustion engine of the hybrid drive and as a propulsion unit of the hybrid drive; and
an operating parameter input connected to the electrical machine and receiving at least one operating parameter of the electrical machine;
wherein the dual-function control unit is configured to:
detect at least one of a control device malfunction error in the hybrid drive, a hybrid drive sensor malfunction error, and a malfunction error in the electrical machine by evaluating the at least one operating parameter;
detect an error in at least one sensor connected to the electrical machine by evaluating at least one further signal at the operating parameter input;
detect an error in at least one component of the control device by monitoring the at least one component; and
if an error in the electrical machine is detected, selectively operate the electrical machine as the starter of the internal combustion engine of the hybrid drive and, independently of the operation of the electrical machine as the starter, at least partially limit the operation of the electrical machine as a propulsion unit,
wherein the received at least one operating parameter is at least one of: a rotational speed, a torque generated or absorbed, a winding voltage, a winding current, a phase shift between winding voltage and winding current, an excitation current, a temperature, an internal winding resistance, and a magnetic field strength, and
wherein the malfunction error in the electrical machine is detected if the received at least one operating parameter does not correspond to the reference standard state of the operating parameter.

11. The control device as recited in claim 10, wherein the dual-function control unit includes a logic circuit having inputs for receiving an error signal and a start-wish signal representing a driver's wish to start one of the hybrid drive or the internal combustion engine of the hybrid drive, wherein the logic circuit is configured to logically link the error signal and the start-wish signal, and wherein if the error signal is present without a simultaneous start-wish signal, the logic circuit is configured to cause the dual-function control unit to at least partially limit the operation of the electrical machine as a propulsion unit, and wherein if the error signal is present with a simultaneous start-wish signal, the logic circuit is configured to cause the dual-function control unit to operate the electrical machine as the starter.

12. The control device as recited in claim 10, wherein the dual-function control unit includes a time delay circuit configured to delay an error signal for a predetermined time period corresponding to the duration of a starting phase of the internal combustion engine.

13. The control device as recited in claim 10, wherein the dual-function control unit includes a time delay circuit and an internal combustion engine status input configured to receive a status value, wherein the time delay circuit is configured to delay an error signal for a time period ending when the status value reflects the end of a starting phase of the internal combustion engine.

14. A method for controlling an electrical machine of a hybrid drive, the electrical machine being configured to be selectively operated both as a starter of an internal combustion engine of the hybrid drive and as a propulsion unit of the hybrid drive, the method comprising:
ascertaining at least one operating parameter value of the electrical machine;
detecting at least one of a control device malfunction error in the hybrid drive, a hybrid drive sensor malfunction error, and a malfunction error in the electrical machine if the at least one operating parameter value does not correspond to a reference standard state of the operating parameter; and
upon detecting of an error, (i) at least partially limiting the operation of the electrical machine as the propulsion unit, and (ii) independently of the operation of the electrical machine as a propulsion unit, at least temporarily operating the electrical machine as the starter,
wherein the ascertained at least one operating parameter value is at least one of: a rotational speed of the electrical machine, a drive power of the electrical machine, and a difference between a setpoint torque and an actual torque, and wherein the control device malfunction error in the hybrid drive is detected if the at least one operating parameter value does not correspond to the reference standard state of the operating parameter.

15. A method for controlling an electrical machine of a hybrid drive, the electrical machine being configured to be selectively operated both as a starter of an internal combustion engine of the hybrid drive and as a propulsion unit of the hybrid drive, the method comprising:
ascertaining at least one operating parameter value of the electrical machine;
detecting at least one of a control device malfunction error in the hybrid drive, a hybrid drive sensor malfunction error, and a malfunction error in the electrical machine if the at least one operating parameter value does not correspond to a reference standard state of the operating parameter; and
upon detecting of an error, (i) at least partially limiting the operation of the electrical machine as the propulsion unit, and (ii) independently of the operation of the electrical machine as a propulsion unit, at least temporarily operating the electrical machine as the starter,
wherein the ascertained at least one operating parameter value is a sensor signal output checked for plausibility, and wherein the hybrid drive sensor malfunction error is detected if the at least one operating parameter value does not correspond to a correct functioning state of the operating parameter.

* * * * *